Figure 1:
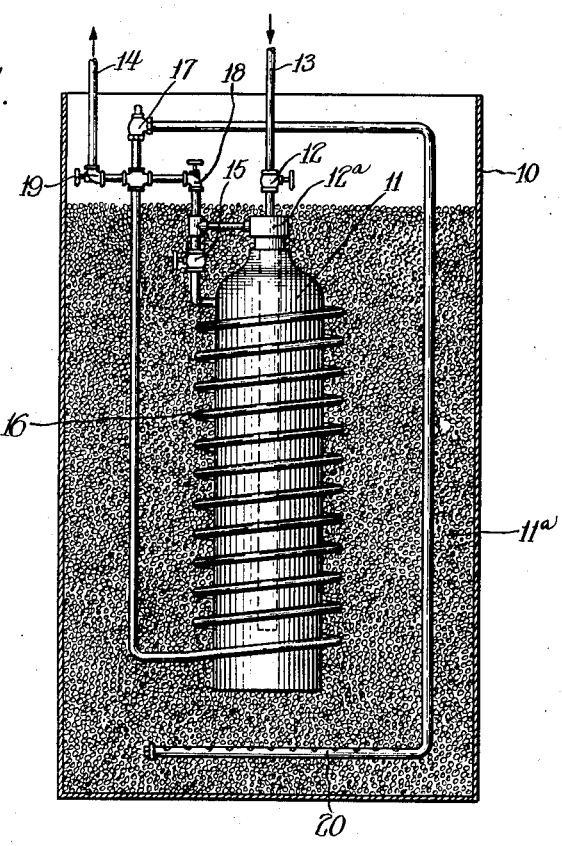

Sept. 6, 1932.   W. J. EDMONDS   1,876,047

APPARATUS AND PROCESS FOR PRESERVING LIQUID CARBON DIOXIDE

Filed July 18, 1928

Inventor:-
William J. Edmonds
By Bonifant Hamilton Atty.

Patented Sept. 6, 1932

1,876,047

UNITED STATES PATENT OFFICE

WILLIAM J. EDMONDS, OF TERRE HAUTE, INDIANA, ASSIGNOR TO COMMERCIAL SOLVENTS CORPORATION, OF TERRE HAUTE, INDIANA, A CORPORATION OF MARYLAND

APPARATUS AND PROCESS FOR PRESERVING LIQUID CARBON DIOXIDE

Application filed July 18, 1928. Serial No. 293,737.

The present invention pertains to the preservation of gaseous substances in a liquid condition, and relates more specifically to an apparatus and process for the storing or transporting of liquid carbon dioxide. The invention comprises certain modifications and improvements of that set forth in the co-pending application of William J. Edmonds, Serial No. 225,234, filed October 10, 1927.

To liquefy carbon dioxide at ordinary temperatures, it must be compressed to a pressure far above atmospheric since at normal pressure it boils at −79° C. Liquid carbon dioxide has, in the past, been an expensive material to store or to ship. The cost of vessels capable of withstanding pressures of a thousand or more pounds per square inch is high, particularly for units of large capacity. The transportation cost of shipping these heavy vessels has likewise been quite high.

The present invention relates to an improved process and apparatus for storing liquid carbon dioxide at a pressure much lower than those pressures heretofore used. One of the advantages of the present invention lies in the saving in container cost which is made possible by the use of these lower pressures. Another advantage resides in the use of a portion of the material itself for auto-refrigeration. A still further advantage lies in the fact that the lower pressure limits specified in the above mentioned co-pending application may be more readily utilized. Other advantages will become apparent. The invention is particularly useful in the shipping of liquid carbon dioxide by tank car or tank wagon.

Briefly, the present invention comprises a vessel in which liquid carbon dioxide is kept at a pressure of only 100–300 pounds, the preferred pressure being 200 pounds, evaporation of the material being greatly retarded by means of an insulation through which such portion of the carbon dioxide as may be gasified at that pressure, is passed as a cold gas. The invention also comprises means for heating such gasified carbon dioxide prior to its passage into the aforesaid insulation. The invention also contemplates a process by which this desirable result is attained.

It has been shown by large scale experiments that carbon dioxide, obtained by scrubbing gas, of fermentation can be liquefied at 1200 lbs., the liquid expanded to a mixture of gas and liquid at 200 lbs., and the residual liquid collected in tank cars with an overall efficiency of at least 46%. Twenty cubic feet (measured at room temperature) of a mixture of gases containing 95% $CO_2$ and 5% $H_2$ compressed to 1200 lbs., and filtered free of oil and dried, will yield a pound of liquid carbon dioxide at 200 lbs. and −25° F.

Figure 2:
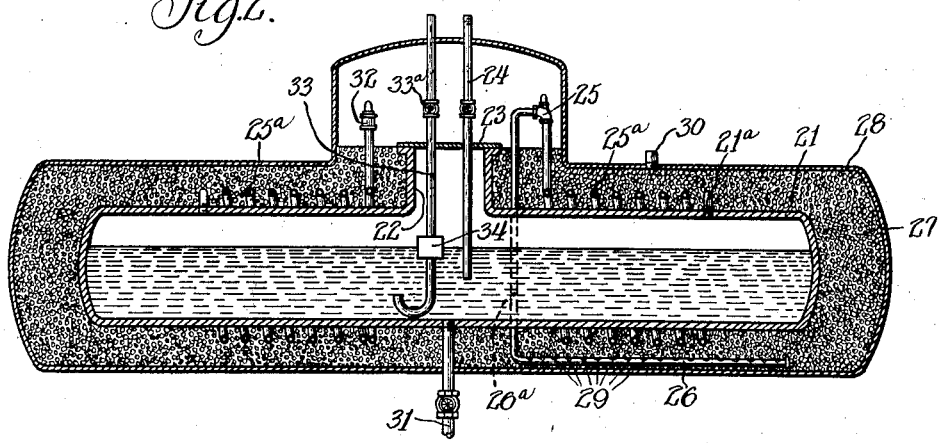

The invention will be more readily understood by reference to the accompanying drawing, in which Fig. 1 represents, diagrammatically, one form of a storage cylinder embodying the principles of the present invention, and Fig. 2 represents, diagrammatically, another form of storage container embodying the principles of the present invention, and being suitable for use as a tank car or truck.

Referring more particularly to the drawing, and especially to Fig. 1, it will be seen that the apparatus comprises essentially an outer container 10 composed of suitable metal, as for example, iron, together with the storage receptacle 11, which is conveniently a steel cylinder of required dimensions and capacity, the cylinder being thoroughly insulated from its surroundings by the loose cork insulation 11a, this insulation being about a foot thick all around the cylinder 11. The cylinder 11 is provided with a suitable connecting member, indicated at 12a, this member providing the means permitting the connection between the cylinder 11 with the inlet valve 12 on the one hand, and with other valves on the other, as will be hereinafter set forth.

Liquid carbon dioxide is expanded through the valve 12 from the liquefaction pressure (1000 lbs. to 1200 lbs.) to 200 lbs. or the pressure of the cylinder. The mixture of gas and liquid enters at 13, and the gas is purged from the cylinder at 14, under the conditions hereafter described. Or, under usual operating pressures, the gas will pass through the valve 15, which is open, then into the coil 16, where it is heated sufficiently to prevent the formation of solid carbon dioxide as it is expanded to atmospheric pressure in the pop valve 17, which valve is usually conveniently set at 200 lbs. The gas released through the pop valve is distributed through the perforated ring 20.

If the pressure of the cylinder 11 is substantially over 200 lbs., it will not be necessary to pass the gas through the coil 16. In this event, valve 15 is closed, valve 18 opened, valve 19 being normally closed at all times. This arrangement cuts off the flow of gas through the valve 15 and the coil 16, and permits the flow to be through the valve 18, pop valve 17, through the ring 20 and thence through the cork insulation 11a.

If at any time the quantity of gas passing through the system is more than the valve 17 can handle, the valve 19 is opened, allowing the excess gas to purge directly to the air through the outlet 14.

The system and connections between the various elements thereof will be apparent from the figure, but obviously many changes in the details may be made without in any way departing from the inventive concept.

In Fig. 2, 21 is a cylindrical pressure resistant vessel of hammer-forged or welded steel, capable of withstanding an internal pressure of at least 500 lbs. per square inch. The cylinder 21 is equipped with a manhole 22 which permits access to its interior. This manhole is ordinarily sealed by a cover 23. Liquid carbon dioxide may be placed in the vessel 21 through 23 by means of a pipe connection 24 equipped with a suitable valve for closure, and a threaded joint to permit the attachment of a supply pipe during the filling operation.

In the drawing, the vessel 21 is shown to be about two-thirds full of liquid carbon dioxide. As was previously indicated it is desired to maintain this material under a pressure of 200 pounds per square inch. This purpose is accomplished by means of a pop valve 25. As is well known, a pop valve is a simple one-way mechanism closed by an adjustable spring. The valve may be set to open at any predetermined pressure by means of the spring adjustment. Such valves are fully described in a number of textbooks and manufacturers' catalogues— see for example, the June, 1923 edition of Crane Company's catalogue, pages 191–196.

In the present instance, the pop valve 25 is set for 200 lbs. and thus serves to regulate the pressure within the vessel 21. It will be seen from the drawing that the vessel 21 is apertured at 21a, the aperture leading to a coil 25a, which in turn communicates with the valve 25. This pop valve is connected by means of a pipe 26a to a perforated pipe 26 through which the valve 25 discharges.

Surrounding the vessel 21 there is a layer of porous insulating material 27, of required thickness, such as granular cork or granular sil-o-cel. The insulation is supported by the outer vessel 28, the insulation occupying the annular space between the vessels 21 and 28. The vessel 28 may also be made of suitable metal, but may be of lighter construction since it is not required to sustain an elevated pressure as in the case of vessel 21.

The pop valve 25 vents directly into the pipe 26a which in turn opens into the pipe 26 provided with perforations 29 opening into the insulation 27. The top of the outer vessel 28 is provided with an open vent 30. The inner vessel 21 is provided with a valve controlled discharge pipe 31.

For safety measure, there is provided a second pop valve 32 in operative connection with the coil 25a. The valve is similar to the valve 25, except that it is set at a little higher pressure than valve 25, say, for example, 225 lbs. and it vents to the open air.

Should the volume of gas formed in the receptacle 21 during the filling thereof be too great for the valves 25 and 32 to handle, the excess gas may be purged directly to the air by opening the valve 33a in the purge line 33. This line is provided with a centrifugal separator 34 which retains any liquid carbon dioxide escaping with the gas issuing through the line 33.

In operation, carbon dioxide carefully freed from all water vapor is liquefied, and a mixture of about one part of liquid carbon dioxide to one part of gaseous carbon dioxide (by weight) enters through the filling line 24 and separates into liquid carbon dioxide which remains in the vessel 21, and carbon dioxide gas which is purged through the valve 33a after removal of entrained liquid in the centrifugal separator. At the beginning of the filling operation the car will ordinarily be empty but cold, as it takes several days after emptying a load for appreciable warming of the vessel 21 to take place. Assuming the capacity of the vessel 21 to be 8000 gallons, ordinarily not more than 1000 lbs. of carbon dioxide (equivalent to 2.5 days heat leaks) should be required to cool the container down to $-25°$ F., the temperature of liquid carbon dioxide at 200 lbs. In fact, 500 lbs. of liquid carbon dioxide are usually sufficient to lower the temperature from 75° F. to $-25°$ F. Liquid carbon dioxide weighs 8.63 pounds per gallon at $-25°$ F., so 60,000 lbs. or 6,950 gallons can be charged into the cold receiver of 8000 gallons capacity. The factor of safety on volume would permit heating of the liquid to 20° F. and the corresponding vapor pressure of 420 lbs. could be allowed since the vessel 21 has been tested to 500 lbs.

Evaporation of the liquid carbon dioxide would take place at 200 lbs. and $-25°$ F. from this car at the rate of about 475 lbs. per day when the outside shell 28 is at 80° F. This gas would ordinarily be purged through the pop valve 25 at 200 lbs. and dispersed through the cork insulation by means of the perforated pipe 26, thus greatly increasing the efficiency of the insulation. Should the rate of evaporation be too great for the valve 25 to take care of it, or should plugging in the valve or perforated pipe occur, the pressure will be relieved at 225 lbs. through the valve 32. In either case the gases will be heated 25 or 30 degrees Fahrenheit before expansion by their passage through the coil 25a. This is a very essential provision since the gases should be sufficiently warm to preclude the formation of solid carbon dioxide in the valves during the expansion of the gases, owing to the Thomson-Joule effect, as such formation of solid carbon dioxide would clog the valves and prevent their functioning. However, should both valves 25 and 32 fail to operate from the start, it would be twenty-four days before the heat leaks would bring the temperature of the liquid up to 20° F. corresponding to a pressure of 421 lbs. This is longer than the time of transit to any shipping point is likely to be, so that it would be improbable that a rupture of the vessel would occur under the worst possible conditions.

It will be seen, therefore, that in the practice of the invention, dry liquid carbon dioxide under a pressure of 200 lbs. or more is passed into the vessel 21 through the filling line or connection 24 in the manner previously described. If the pressure at which the gas is admitted exceeds 200 lbs. the excess pressure is automatically relieved by the pop valve 25. When the vessel has been filled to the desired height, the connection 24 is closed.

As in the case of all other liquids, the boiling point of liquid carbon dioxide is dependent upon the pressure. If the liquid carbon dioxide used to fill the vessel is originally at a pressure much in excess of 200 lbs., the reduction in pressure during filling will tend to gasify some of the material, and this gas will also leave the vessel through the pop valve 25, or if the quantity thereof be too great for the valve to handle, the excess may be purged directly to the air through the line 33 by opening the valve 33a. In any event, there will be some gasification when the liquid first comes in contact with the vessel, as previously mentioned, and should the vessel be warm, say at some normal climatic temperature, this gasification will be very considerable, since the vapor pressure of liquid carbon dioxide at ordinary temperatures is considerably over 200 lbs., e. g., about 850 lbs. at 21° C. As a result of the evaporation, the carbon dioxide will be cooled. Even if necessary to pass excess of gas through the line 33, there will be gas leaving the vessel 21 through the valve 25.

From the valve 25, the gas is conveyed downwardly into the perforated pipe 26 embedded in the insulation 27 within the annular space between the vessels 21 and 28. The cold gas is discharged into this annular space through the perforations 29. This cold gas permeates through the insulation 27, where it absorbs heat and gradually rises in the annular space, the upward motion being sustained by the influx of further gas. The gas is discharged from the apparatus through the vent 30, or in case of imperfect operation of the valve 25, through the valve 32 when the pressure in vessel 21 reaches 225 lbs. As a result of the vaporization of liquid within the vessel 21 and the continued passage of cold gas through the insulation 27 the temperature of the insulation and of the vessel 21 is gradually lowered. The evaporation and circulation of the cold gas will continue until, by cooling of the liquid carbon dioxide, its vapor pressure is reduced to 200 lbs. This will be at about $-25°$ F. At this temperature, the pop valve at 200 lbs. will prevent further evaporation.

The passage of the cold gaseous carbon dioxide through the annular space and through the interstices of the insulation 27 acts to abstract heat from these parts and thus to reduce their temperature. When the apparatus reaches a lower heat level than that of the surrounding air there is a transfer of heat from the air to the outer vessel 28. Some of this heat is absorbed by the cold gaseous carbon dioxide flowing in contact with the inner wall of the vessel 28. The insulation in the annular space also serves to prevent the transfer of heat to the inner vessel 21 and in this respect it is about 40% more effective than it would be in an atmosphere of air—owing to the lower heat conductivity of carbon dioxide.

The apparatus containing the liquid carbon dioxide thus comes to an equilibrium at 200 pounds pressure and at this equilibrium the carbon dioxide itself and the inner vessel 21 are at a temperature below the boiling point of liquid carbon dioxide under the 200 lbs. pressure. Since no insulation is perfect, there is inevitably some small quantity of heat transferred to the liquid and this heat will cause the gasification of more liquid. The heat absorbed by the carbon dioxide itself in the process of vaporization, and is carried out of the vessel with the gaseous carbon dioxide.

In practice, it has been found that a twelve inch space filled with granular cork or sil-o-cel provides sufficient insulation to reduce the evaporation loss of about 0.8% of its contents per day. Should the pop valves fail to function at all, the car could remain in transit for ten days without serious danger. The car can be unloaded by forcing the contents by gas pressure into another vessel at low temperature, but capable of withstanding a pressure of 1,200 pounds. The contents of the second vessel can be discharged into cylinders. Or, a more direct method of charging the cylinders is to pump the liquid directly from the tank car at 200 lbs., through an insulated pump, into cylinders at 700–1200 lbs.

The heating coil employed in accordance with this invention is of such length that the gas is heated through a temperature range of 20°–30° C. before its expansion, making it possible to expand from initial pressures as low as 100 lbs. without solidification of the carbon dioxide in the pop valve.

As heretofore indicated, the invention is particularly applicable to the shipment of liquid carbon dioxide in tank cars or tank wagons. The apparatus shown in Fig. 2 is especially designed for this use and may be readily attached to the desired type of vehicle carriage. Since the liquid is contained in the inner vessel 21, the weight of the apparatus must be transferred to the carriage from that point, rather than from the outer vessel 28. The details of this construction are set forth in aforesaid co-pending application Ser. No. 225,234.

It is obvious that many structural changes may be made in the apparatus without departing from the spirit of this invention. For example, another jacket might be placed around the vessel 28, forming a second annular space, and the gaseous carbon dioxide vent 30 might discharge into this annular space and pass through it before reaching the outside air. This space might also be filled with insulation as in the case of the space between the vessels 21 and 28. Instead of placing the pop valves 25 and 32 in the position illustrated, they may be located within the annular space between the vessels 21 and 28. The pipe 26a conveying the gaseous carbon dioxide released by the valve 25 at a predetermined pressure might pass directly downwardly through the liquid in vessel 21, and through the vessel itself instead of passing around the vessel 21 as indicated in the drawing. The manhole cover 23 may be specially insulated to prevent the transfer of heat to that point. Other structural changes will undoubtedly occur to those skilled in the art.

In a like manner, the process is susceptible to similar changes without departing from the spirit of the invention. The liquid carbon dioxide might be preserved in vessel 21 at any convenient pressure above 200 lbs. by merely changing the adjustment of the pop valves and the process and apparatus would function in precisely the same manner as was described above. The practical point involved is merely that it is most economical to use the lowest storage pressure possible in order to reduce the thickness of the vessel 21 to a point where it can be cheaply constructed; and to take advantage, as far as possible, of the auto-refrigeration caused by the gasification of the liquid carbon dioxide. Such a plan is to be preferred, rather than the old method of preserving the liquid carbon dioxide at extremely high pressures without cooling. Also, the use of a light apparatus reduces the basic cost of transportation.

While the invention has been described as suitable for preserving and transporting liquid carbon dioxide, it may likewise be employed for the shipment of other liquefied gases such as ammonia, methane, ethane, etc. It will be understood that the details of the invention as specifically described herein are illustrative only of means employed for attaining the desired objects, and it will be also understood that it is desired to comprehend within the scope of this invention such modifications and changes as may be necessary to adapt it to varying conditions and uses.

What is claimed is:

1. A container for liquefied gases which comprises a pressure-resistant, liquid-containing vessel serving as an inner vessel, an outer vessel surrounding the said inner vessel, the said vessels defining a space between them, a heating coil within the space for heating gases evolved in the said liquid-containing vessel, the said coil at least partially enveloping the liquid-containing vessel, and means for passing the said gases into the coil.

2. A container for liquefied gases which comprises a pressure-resistant, liquid-containing vessel serving as an inner vessel, an outer vessel surrounding the said inner vessel, the vessels defining a space between them, a heating coil for gases evolved in the said liquid-containing vessel, means for passing the said pases through the coil, and means for conveying the said gases through the said space.

3. A container for liquefied gases comprising a pressure-resistant, liquid-containing vessel serving as an inner vessel, an outer vessel surrounding the inner vessel, the said vessels defining a space between them, a porous insulation in the space between the said vessels, a coil at least partially enveloping the said inner vessel and embedded in the said insulation, the coil being adapted to heat gases evolved in the inner or liquid-containing vessel, means for conveying the gases through the coil, and means for conveying the gases through the said space and insulation.

4. A container for liquefied gases comprising a pressure-sustaining, liquid-containing vessel, a second vessel surrounding the said liquid-containing vessel and forming an annular space therewith, a porous insulation in the said space, a coil embedded in the said insulation adapted to heat gases evolved in the liquid-containing vessel, means for conveying the said gases to the coil, and means for conveying the said gases through the space and insulation.

5. A container for liquefied gases comprising a pressure-sustaining, liquid-containing vessel, a second vessel surrounding the liquid-containing vessel and forming an annular space therewith, a porous insulation within the said space, means for maintaining the liquid at a predetermined pressure by releasing gas evolved at such pressure, and means within the space communicating with the said liquid-containing vessel for heating the said gas.

6. A container for liquefied gases comprising a pressure-sustaining, liquid-containing vessel, a second vessel surrounding the liquid-containing vessel and forming an annular space therewith, a porous insulation within the said space, means for maintaining the liquid at a predetermined pressure by releasing gas evolved at such pressure, a coil at least partially enveloping the said liquid-containing vessel and communicating therewith, the said coil being adapted to heat the said gas, and means for passing the gas through the said space and insulation.

7. A container for liquefied gases comprising a pressure-sustaining, liquid-containing vessel, a second vessel surrounding the said liquid-containing vessel and forming an annular space therewith, a porous insulation within the said space, means for maintaining the liquid-containing vessel under a pressure in excess of 100 pounds by releasing gas generated at such pressure, and means for heating the said gas, the said means being in communication with the liquid-containing vessel.

8. A container for liquefied gases comprising a pressure-sustaining, liquid-containing vessel, a second vessel surrounding the said liquid-containing vessel and forming an annular space therewith, a porous insulation within the said space, means for maintaining the liquid-containing vessel under a pressure in excess of 100 pounds by releasing gas generated at such pressure, a coil communicating with the said liquid-containing vessel and adapted to heat the said gas, and means for conveying the said gas through the said space and insulation.

9. A container for liquefied carbon dioxide comprising a pressure-sustaining, liquid-containing vessel, a second vessel surrounding the liquid-containing vessel and forming an annular space therewith, a porous insulation within the said space, means for releasing gaseous carbon dioxide from the liquid-containing vessel at a pressure of about 200 pounds, and means for heating the said gas, the said heating means being within the annular space and in communication with the liquid-containing vessel.

10. A container for liquefied carbon dioxide comprising a pressure-sustaining, liquid containing vessel, a second vessel surrounding the liquid-containing vessel and forming an annular space therewith, a porous insulation within the said space, means for releasing gaseous carbon dioxide from the liquid-containing vessel at a pressure of about 200 pounds, a coil within the said space and adapted to heat the gas, and means for conveying the said gas through the said space and insulation.

11. The art of preserving liquefied gases which comprises maintaining the liquid at a predetermined pressure above atmospheric, heating the gas evolved at the said pressure, expanding and passing the said gas through a layer of porous insulation in thermal contact with the liquid.

12. The art of preserving liquid carbon dioxide at a pressure at which it would normally boil if exposed to the heat of the atmosphere, which comprises heating the carbon dioxide evolved as a gas at the said pressure, expanding the said gas to substantially one atmosphere, and then passing it through a layer of porous insulation in thermal contact with the said liquid.

13. The art of preserving liquid carbon dioxide which comprises maintaining it at a pressure in excess of 100 pounds while heating the gas evolved at that pressure, and expanding the said gas to substantially one atmosphere and passing the said gas through a layer of porous insulation in thermal contact with the liquid.

14. The art of preserving liquefied gases which comprises maintaining the liquid at a predetermined pressure above atmospheric, which comprises maintaining at substantially the said pressure the gas evolved from the liquid, heating the said gas in thermal contact with the said liquid, and expanding the gas to substantially atmospheric pressure, the said heating being sufficient to prevent solidification of the gas upon expansion.

15. The art of preserving liquefied gases which comprises maintaining the liquid at a predetermined pressure above atmospheric, which comprises maintaining at substantially the said pressure, the gas evolved from the liquid, heating the said gas in thermal contact with the said liquid, and expanding the said gas to substantial atmospheric pressure and passing said gas through a body of porous insulation also in thermal contact with the liquid, the said heating being only sufficient to prevent solidification of the gas upon expansion.

16. A container for liquefied gases comprising a pressure-sustaining, liquid-containing vessel, a second vessel surrounding the liquid-containing vessel and forming an annular space therewith, a porous insulation within the said space, means for heating gas evolved from the liquid-containing vessel, means operative at substantially the predetermined pressure of the liquid-containing vessel for expanding the said gas from the said predetermined pressure down to substantially atmospheric, and means operative at a pressure somewhat higher than the first means for expanding the said gas upon inoperativeness of the said first means.

In testimony whereof I affix my signature.

WILLIAM J. EDMONDS.